United States Patent
Tanaka et al.

(10) Patent No.: US 10,670,216 B2
(45) Date of Patent: Jun. 2, 2020

(54) VEHICLE LAMP INCLUDING ROTARY REFLECTOR

(71) Applicant: Koito Manufacturing Co., Ltd., Tokyo (JP)

(72) Inventors: Hidetada Tanaka, Shizuoka (JP); Kazutoshi Sakurai, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 35 days.

(21) Appl. No.: 15/975,120

(22) Filed: May 9, 2018

(65) Prior Publication Data
US 2018/0335192 A1 Nov. 22, 2018

(30) Foreign Application Priority Data
May 17, 2017 (JP) ................................. 2017-098227

(51) Int. Cl.
| | | |
|---|---|---|
| F21S 41/675 | (2018.01) | |
| F21S 41/32 | (2018.01) | |
| F21S 43/40 | (2018.01) | |
| G02B 27/09 | (2006.01) | |
| F21S 43/20 | (2018.01) | |
| F21S 41/25 | (2018.01) | |
| F21S 45/00 | (2018.01) | |
| F21S 41/148 | (2018.01) | |
| F21S 45/47 | (2018.01) | |
| F21S 41/153 | (2018.01) | |
| F21S 41/663 | (2018.01) | |
| F21Y 105/12 | (2016.01) | |

(52) U.S. Cl.
CPC ........... *F21S 41/321* (2018.01); *F21S 41/148* (2018.01); *F21S 41/153* (2018.01); *F21S 41/25* (2018.01); *F21S 41/32* (2018.01); *F21S 41/663* (2018.01); *F21S 41/675* (2018.01); *F21S 43/26* (2018.01); *F21S 43/40* (2018.01); *F21S 45/00* (2018.01); *F21S 45/47* (2018.01); *G02B 27/0955* (2013.01); *G02B 27/0977* (2013.01); *F21Y 2105/12* (2016.08)

(58) Field of Classification Search
CPC ..... F21S 41/67–675; F21S 41/147–148; F21S 41/151; F21S 41/153; F21S 41/25
See application file for complete search history.

(56) References Cited

U.S. PATENT DOCUMENTS

2014/0313755 A1* 10/2014 Tanaka .................... F21S 41/19
362/514

FOREIGN PATENT DOCUMENTS

JP        2015-026628 A        2/2015

* cited by examiner

*Primary Examiner* — Sean P Gramling
(74) *Attorney, Agent, or Firm* — Abelman, Frayne & Schwab

(57) ABSTRACT

An optical unit includes a light source and a rotary reflector configured to reflect a light emitted from the light source and rotate around a rotation axis in one direction. The rotary reflector is provided with a reflective surface such that a desired light distribution pattern is formed by scanning a light of a light source reflected by the rotary reflector while the rotary reflector is rotated. The light source includes a first light-emitting portion configured to be turned on when forming a first light distribution pattern that mainly illuminates a range lower than a horizontal line, and a second light-emitting portion configured to be turned on when forming a second light distribution pattern that illuminates a range at least higher than the horizontal line.

10 Claims, 10 Drawing Sheets

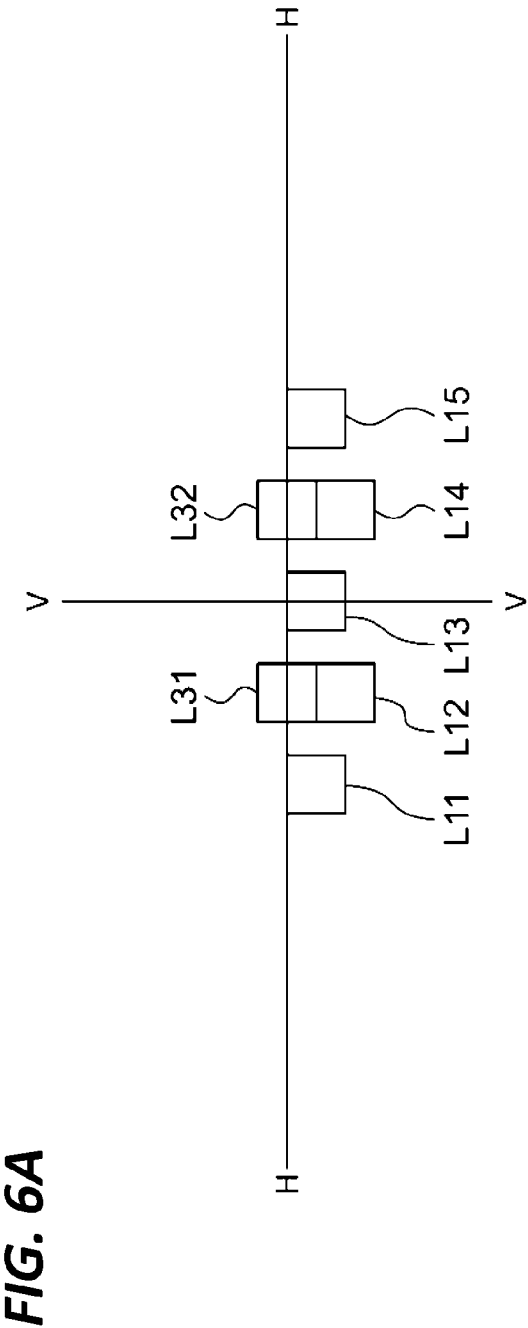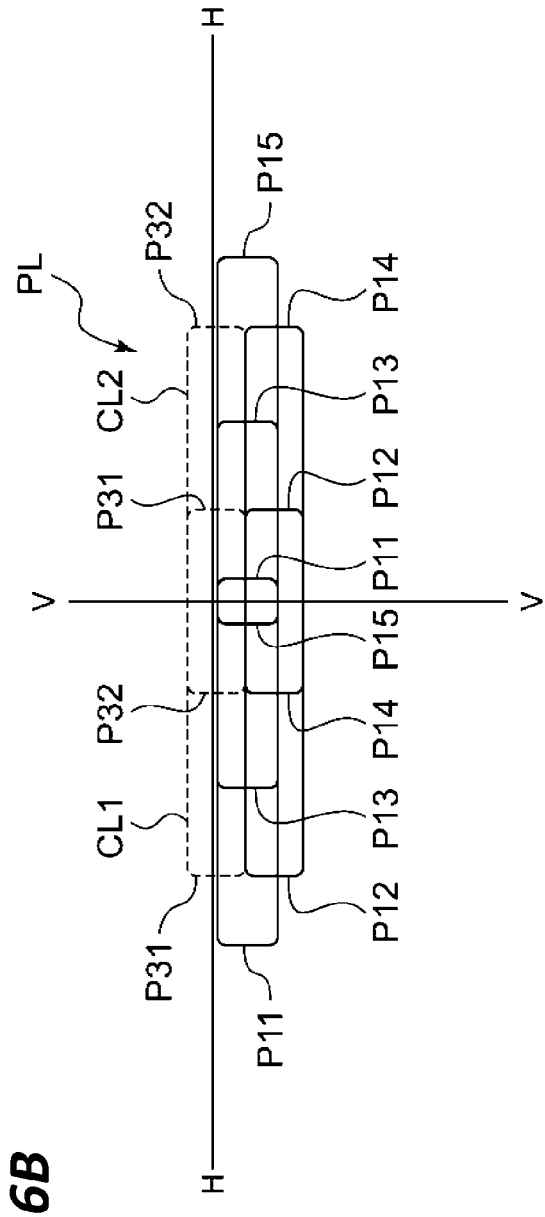

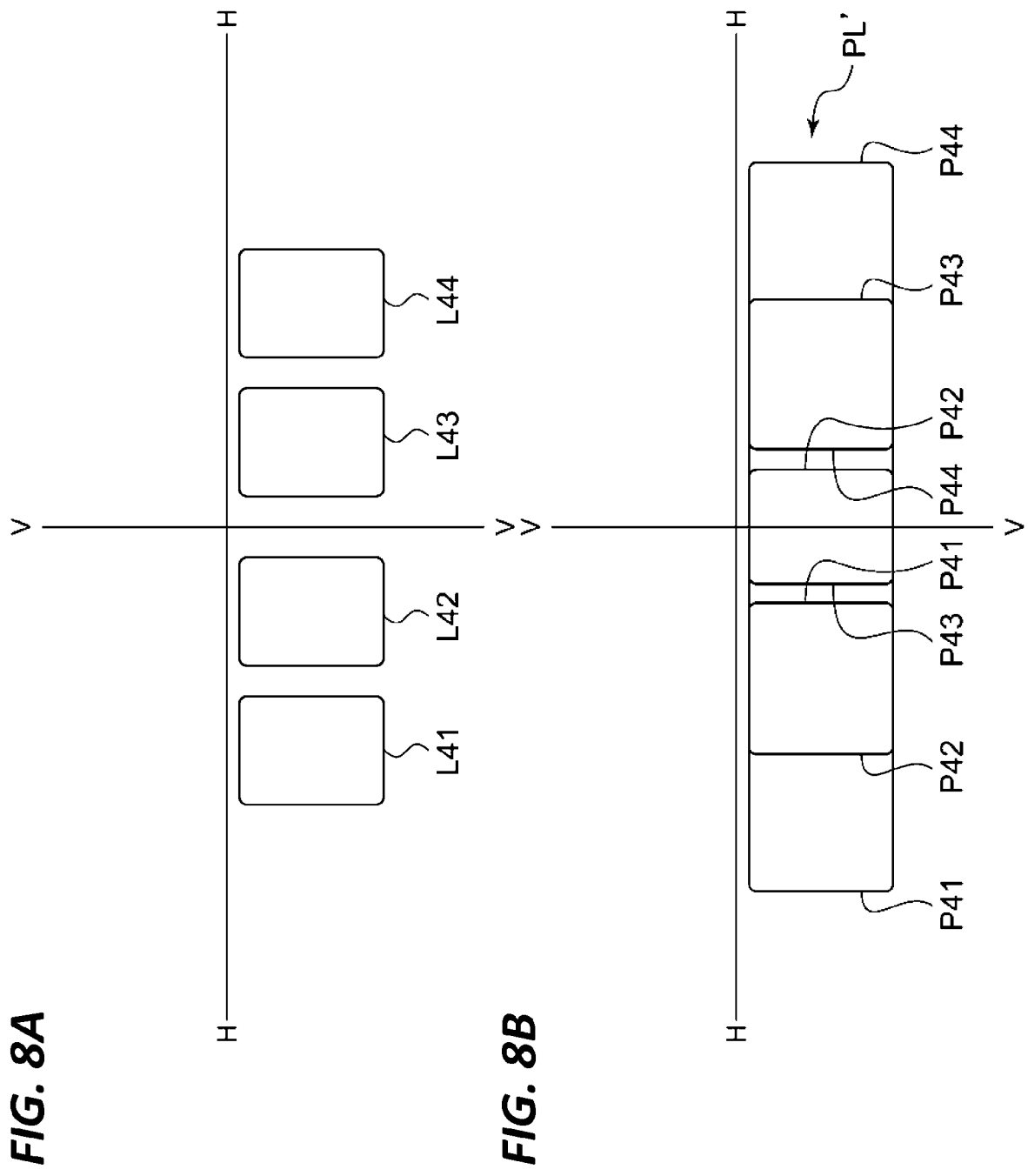

VEHICLE LAMP INCLUDING ROTARY REFLECTOR

CROSS-REFERENCE TO RELATED APPLICATIONS

This application is based on and claims priority from Japanese Patent Application No. 2017-098227, filed on May 17, 2017, with the Japan Patent Office, the disclosure of which is incorporated herein in its entirety by reference.

TECHNICAL FIELD

The present disclosure relates to an optical unit and, more particularly, to an optical unit used for a vehicular lamp.

BACKGROUND

Recently, there has been proposed a device that forms a predetermined light distribution pattern by reflecting the light emitted from a light source to the front of a vehicle and scanning the region in front of the vehicle with the reflected light. For example, there has been proposed an optical unit including a rotary reflector that rotates in one direction around a rotation axis while reflecting light emitted from a light source, and a plurality of light sources including light-emitting elements. The rotary reflector is provided with a reflective surface such that a desired light distribution pattern is formed by the light of the light source reflected by the rotary reflector while the rotary reflector is rotated (see, e.g., Japanese Patent Laid-Open Publication No. 2015-026628).

SUMMARY

A lamp unit including the above-described optical unit is for forming a light distribution pattern for high beam and a separate lamp unit is required to form a light distribution pattern for low beam.

The present disclosure has been made in view of this situation. For this purpose, the present disclosure provides a new optical unit capable of forming a plurality of light distribution patterns with a simple structure.

In order to solve the above-described problem, an optical unit according to an aspect of the present disclosure includes: a light source; and a rotary reflector that rotates in one direction around a rotation axis while reflecting a light emitted from the light source. The rotary reflector is provided with a reflective surface such that a desired light distribution pattern is formed by scanning a light of a light source reflected by the rotary reflector while the rotary reflector is rotated, and the light source includes: a first light-emitting portion configured to be turned on when forming a first light distribution pattern that mainly illuminates a range lower than a horizontal line; and a second light-emitting portion configured to be turned on when forming a second light distribution pattern that illuminates a range at least higher than the horizontal line.

According to the aspect, a plurality of light distribution patterns having different illumination ranges may be formed by using a rotary reflector that rotates in one direction around the rotation axis while reflecting the light emitted from the light source. In addition, the first light-emitting portion and the second light-emitting portion may have one or more light-emitting elements.

The light source may further include a third light-emitting portion configured to emit a light constituting an own vehicle side cutoff line near the horizontal line when forming the first light distribution pattern. The third light-emitting portion may be disposed in a region between the first light-emitting portion and the second light-emitting portion. Thus, it is possible to change the position of the own vehicle side cut-off line by scanning the light emitted from the third light-emitting portion and controlling the light-on/light-off of the third light-emitting portion.

The first light-emitting portion has a plurality of first light-emitting elements that are arranged in a zigzag form along a predetermined direction, and the first light-emitting elements each have a rectangular light-emitting surface and one side of the rectangular light-emitting surface is arranged along the predetermined direction. The second light-emitting portion has a plurality of second light-emitting elements that are arranged in a zigzag form along the predetermined direction, and the second light-emitting elements each have a rectangular light-emitting surface and one side of the rectangular light-emitting surface is arranged along the predetermined direction. The third light-emitting portion has third light-emitting elements arranged between the first light-emitting elements and the second light-emitting elements, and one side of the rectangular light-emitting surface of the third light-emitting element is arranged along the predetermined direction. Thus, dark regions due to gaps between the elements are less likely to occur in the light distribution pattern.

The optical unit may further include a controller configured to control the light-on state of the light source so that the light-on time of the third light-emitting portion when the first light distribution pattern is formed becomes shorter than the light-on time of the first light-emitting portion. Thus, it becomes possible, for example, to raise only the upper end of the own vehicle side cutoff line.

The first light-emitting portion may be turned on when the second light distribution pattern is formed. Thus, a new light distribution pattern other than the first light distribution pattern and the second light distribution pattern may be implemented.

The optical unit may further include a projection lens configured to project the light reflected by the rotary reflector in a light illuminating direction of the optical unit. Thus, a light source image may be clearly projected in front of the optical unit.

Further, any combination of the above-described components and a conversion of the expressions of the present disclosure among, for example, a method, a device, and a system are also effective as an aspect of the present disclosure.

According to the present disclosure, a plurality of light distribution patterns may be formed with a simple structure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6A is a schematic view illustrating a state in which a first light-emitting portion and a third light-emitting portion in a turned-on state are reflected by a stationary rotary reflector and projected forward as a light source image. FIG. 6B is a view illustrating a first light distribution pattern formed when the light source image illustrated in FIG. 6A is scanned due to rotation of the rotary reflector.

FIG. 8A is a schematic view illustrating a state in which a fourth light-emitting portion in a turned-on state is reflected by a stationary rotary reflector and projected forward as a light source image. FIG. 8B is a view illustrating a third light distribution pattern formed when the light source image illustrated in FIG. 8A is scanned due to rotation of the rotary reflector.

DETAILED DESCRIPTION

In the following detailed description, reference is made to the accompanying drawings, which form a part thereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure will be described with reference to the accompanying drawings. Equal or equivalent components, members, and processes illustrated in each of the drawings will be denoted by the same symbols, and overlapping descriptions thereof will be appropriately omitted. Further, the exemplary embodiment is not intended to limit the present disclosure thereto, but is illustrative of the present disclosure. All the features described in the exemplary embodiment or combinations thereof are not necessarily essential for the present disclosure.

The optical unit of the present disclosure may be used for various types of vehicular lamps. Hereinafter, a description will be made of a case where the optical unit of the present disclosure is applied to the vehicular headlights among the vehicular lamps.

[First Exemplary Embodiment]
(Vehicular Lamp)

Figure 1:
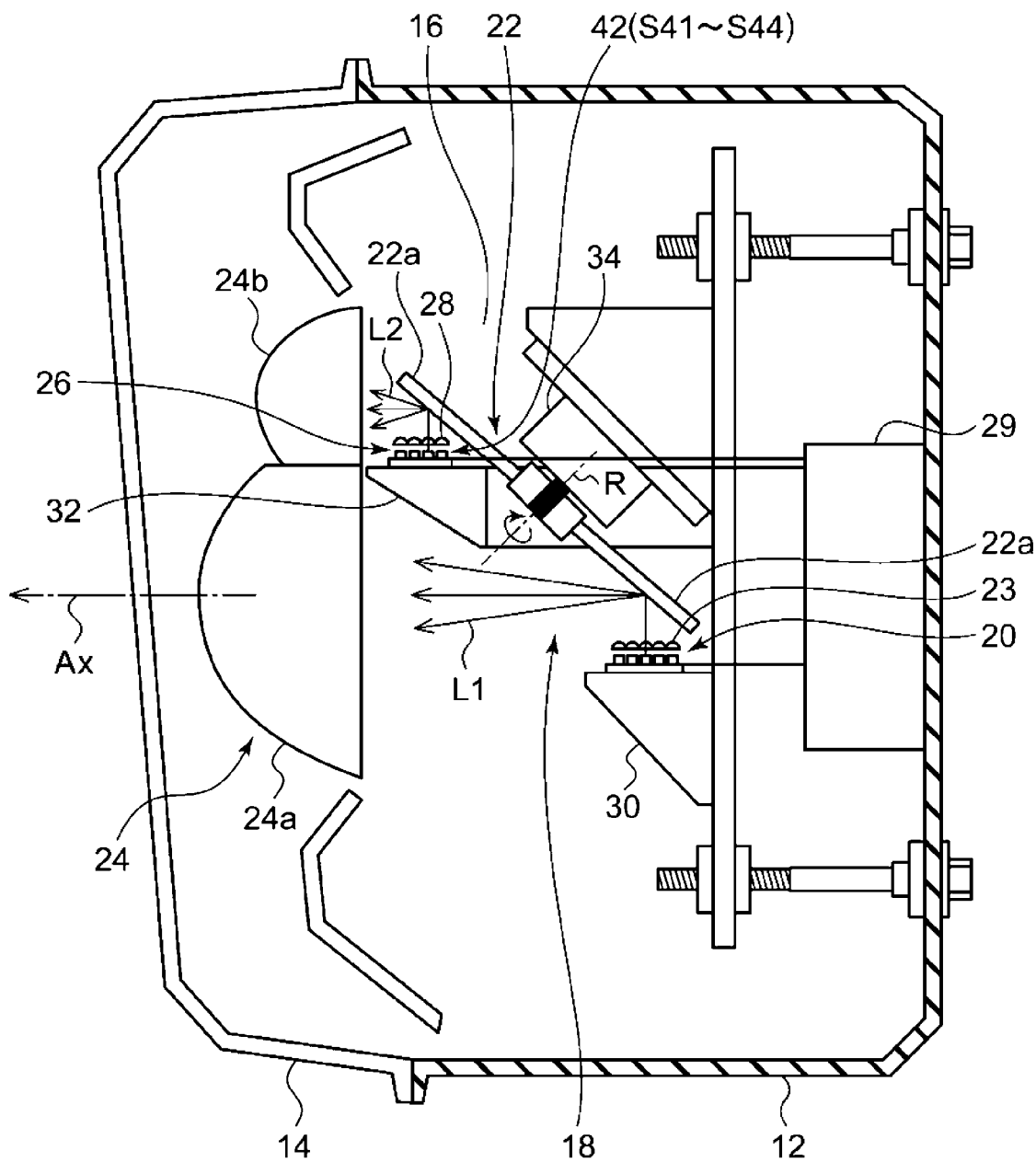
FIG. 1 is a horizontal sectional view of a vehicular headlight according to an exemplary embodiment.
Figure 2:
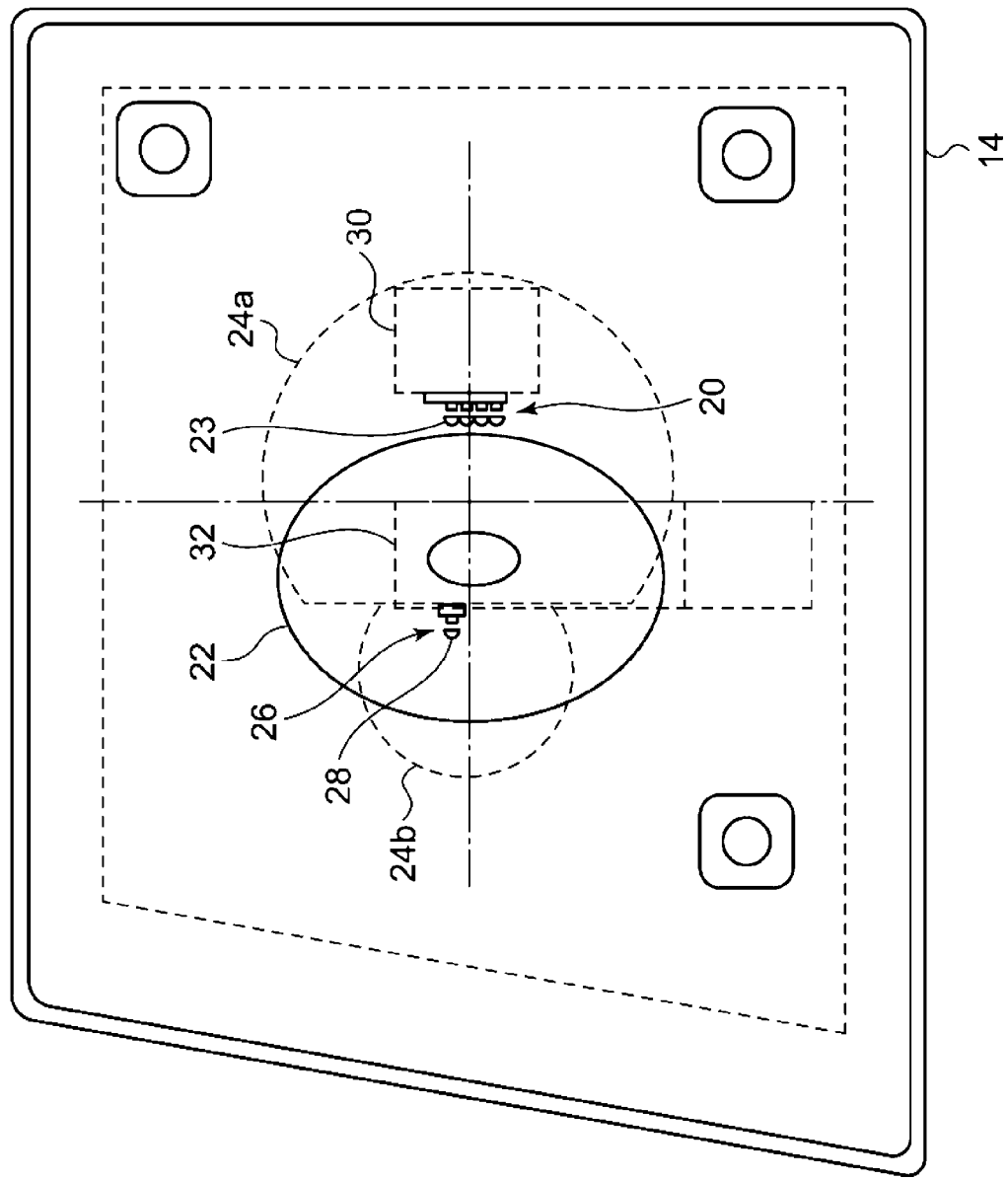
FIG. 2 is a front view of the vehicular headlight according to the present exemplary embodiment.

FIG. 1 is a horizontal sectional view of a vehicular headlight according to the present exemplary embodiment. FIG. 2 is a front view of the vehicular headlight according to the present exemplary embodiment. Further, in FIG. 2, some of the components are omitted.

A vehicular headlight 10 according to the present exemplary embodiment is a right-side headlight mounted on the right side of the front end of an automobile and has the same structure as the headlight mounted on the left side except that it is bilaterally symmetrical. Therefore, in the following, the right-side vehicular headlight 10 will be described in detail, and a description of the left-side vehicular headlight will be omitted.

As illustrated in FIG. 1, the vehicular headlight 10 includes a lamp body 12 having a concave portion opening toward the front. The front opening of the lamp body 12 is covered with a transparent front cover 14 so as to form a lamp chamber 16. The lamp chamber 16 functions as a space in which one optical unit 18 is accommodated. The optical unit 18 is a lamp unit configured to irradiate both the variable high beam and the low beam. The variable high beam is controlled to change the shape of the light distribution pattern for the high beam. For example, a non-illuminated region (light-shielding portion) may be generated in a portion of the light distribution pattern.

An optical unit 18 according to the present exemplary embodiment includes: a first light source 20; a condensing lens 23 as a primary optical system (optical member) configured to change an optical path of a first light L1 emitted from a first light source 20 and direct the changed optical path toward a blade 22a of a rotary reflector 22; the rotary reflector 22 configured to reflect the first light L1 while rotating around a rotation axis R; a projection lens 24; a second light source 26 disposed between the first light source 20 and the projection lens 24; a diffusing lens 28 as a primary optical system (optical member) configured to direct a second light L2 emitted from the second light source 26 toward the blade 22a; and a controller 29.

In the first light source 20, sixteen elements are arranged in the form of a matrix. In the second light source 26, four elements are arranged in a row.

The projection lens 24 includes: a condensing portion 24a configured to condense and project the first light L1 reflected by the rotary reflector 22 in the light illuminating direction of the optical unit (leftward direction in FIG. 1); and a diffusing unit 24b configured to diffuse and project the second light L2 reflected by the rotary reflector 22 in the light illuminating direction of the optical unit. Thus, a light source image may be clearly projected in front of the optical unit 18.

Figure 3:
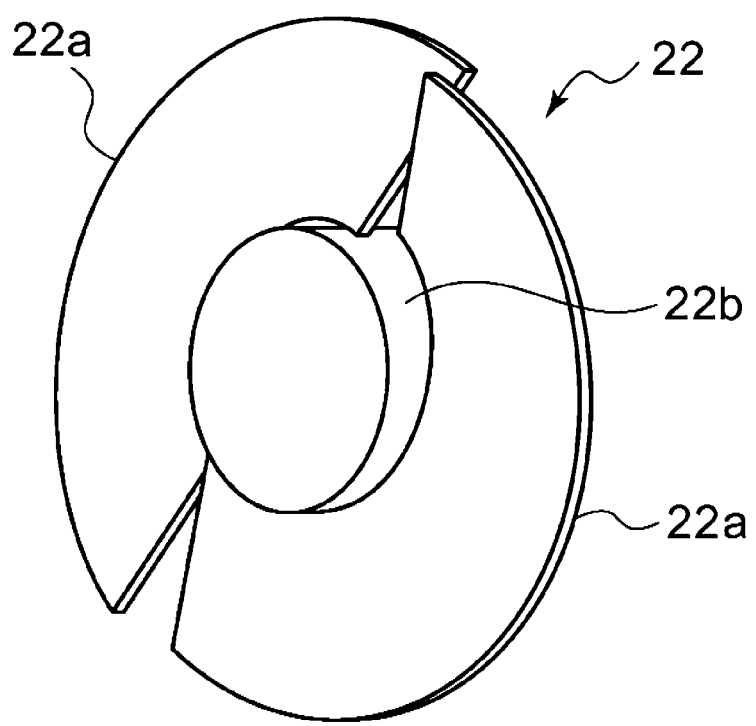
FIG. 3 is a side view schematically illustrating a configuration of a rotary reflector according to the present exemplary embodiment.
Figure 4:
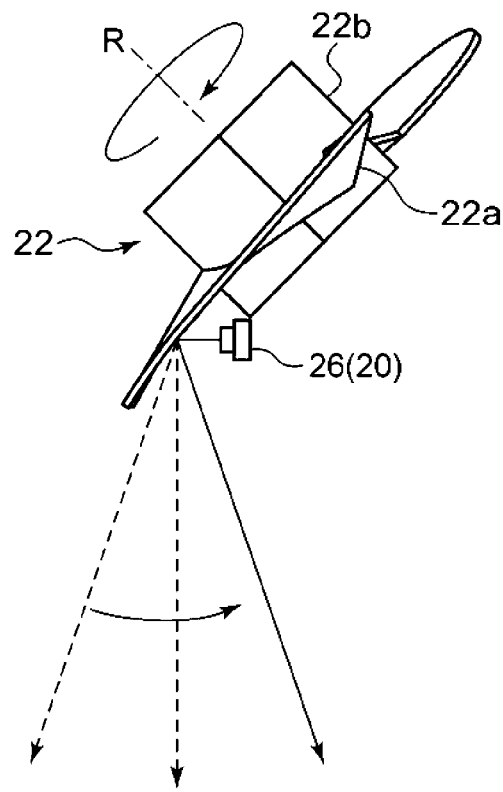
FIG. 4 is a top view schematically illustrating a configuration of the rotary reflector according to the present exemplary embodiment.

FIG. 3 is a side view schematically illustrating a configuration of a rotary reflector according to the present exemplary embodiment. FIG. 4 is a top view schematically illustrating a configuration of the rotary reflector according to the present exemplary embodiment.

The rotary reflector 22 rotates in one direction around the rotation axis R by means of a drive source such as a motor 34. Further, the rotary reflector 22 is provided with a blade 22a serving as a reflective surface so as to form a desired light distribution pattern by scanning the light of each light source reflected by the rotary reflector while the rotary reflector is rotated. That is, the rotary reflector emits visible light from a light-emitting portion as an illuminating beam by its rotation operation, and forms the desired light distribution pattern by scanning the illuminating beam.

The rotary reflector 22 is provided with two blades 22a of the same shape functioning as a reflective surface around a cylindrical rotating portion 22b. The rotation axis R of the rotary reflector 22 is inclined with respect to an optical axis Ax and is provided in a plane including the optical axis Ax and each light source. That is, the rotation axis R is arranged substantially in parallel to a scanning plane of the light (illuminating beam) of each light source which is scanned in the lateral direction by the rotation. Thus, the thickness of the optical unit may be reduced. Here, the scanning plane may be understood as a fan-shaped plane formed by continuously connecting the trajectories of lights of the respective light sources, which are, for example, scanning lights.

Further, the shape of the blade 22a of the rotary reflector 22 is twisted so that an angle formed by the optical axis Ax and the reflective surface changes in a circumferential direction centered on the rotation axis R. Thus, as illustrated in FIG. 4, it is possible to perform scanning using the light of the first light source 20 or the second light source 26.

For each light source, semiconductor light-emitting elements such as LEDs, EL elements, and LD elements are used. The shape of the convex projection lens 24 having a condensing portion 24a and a diffusing portion 24b may be appropriately selected in accordance with light distribution characteristics such as the required light distribution pattern and illuminance distribution, but an aspherical lens or a free curved face lens may also be used.

The controller 29 controls the light-on/light-off control of the first light source 20 and the second light source 26 and the rotation control of the motor 34 based on an external control signal. The first light source 20 is mounted on a heat sink 30 and the second light source 26 is mounted on a heat sink 32.

Figure 5:
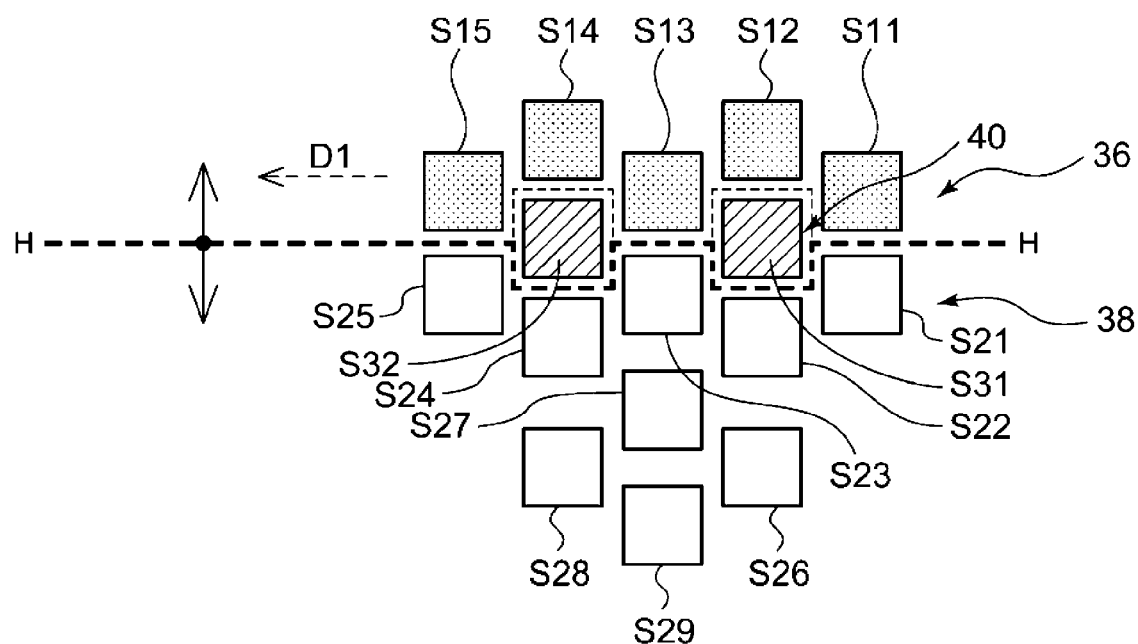
FIG. 5 is a schematic view of a first light source according to the present exemplary embodiment, in which the first light source is viewed from the front.

FIG. 5 is a schematic view of a first light source according to the present exemplary embodiment in which the first light source is viewed from the front. In FIG. 5, the illustration of the condensing lens 23 is omitted. In addition, the light source image of FIG. 5 is reversed up and down by the projection lens 24.

As illustrated in FIG. 5, the first light source 20 includes: a first light-emitting portion 36 that is turned on when forming a first light distribution pattern that mainly illuminates a range lower than the horizontal line; a second light-emitting portion 38 which is turned on when forming a second light distribution pattern that illuminates at least a range higher than the horizontal line; and a third light-emitting portion 40 that emits light constituting a own vehicle side cutoff line near the horizontal line when the first light distribution pattern is formed. The third light-emitting portion 40 is disposed in a region between the first light-emitting portion 36 and the second light-emitting portion 38.

The first light-emitting portion 36 is configured such that five first light-emitting elements S11 to S15 are arranged along a horizontal direction (line H-H) in a zigzag form (i.e., a vertical position of a certain element is shifted upward or downward relative to an adjacent element). Each of the first light-emitting elements S11 to S15 has a rectangular light-emitting surface, and one side of the rectangular light-emitting surface is arranged to be parallel to the horizontal direction.

In the second light-emitting portion 38, nine second light-emitting elements S21 to S29 are arranged in a zigzag form along the horizontal direction. Each of the second light-emitting elements S21 to S29 has a rectangular light-emitting surface, and one side of the rectangular light-emitting surface is arranged to be parallel to the horizontal direction.

The third light-emitting portion 40 has two third light-emitting elements S31 and S32 disposed between the first light-emitting elements S11 to S15 and the second light-emitting elements S21 to S29, and one side of the rectangular light-emitting surface is arranged to be parallel to the horizontal direction. Thus, dark regions due to gaps between the elements are less likely to occur in the light distribution pattern.

In addition, for each light-emitting element, a semiconductor light-emitting element that can easily control the light-on/light-off in a short time is suitable. Examples of such light-emitting elements include a light-emitting device (LED), a laser diode (LD), and an electroluminescent element.

FIG. 6A is a schematic view illustrating a state in which a first light-emitting portion and a third light-emitting portion in a turned-on state are reflected by a stationary rotary reflector and projected forward as a light source image. FIG. 6B is a view illustrating a first light distribution pattern formed when the light source image illustrated in FIG. 6A is scanned due to rotation of the rotary reflector.

The light source images L11 to L15 illustrated in FIG. 6A correspond to the respective light-emitting surfaces of the first light-emitting elements S11 to S15. Further, the light source images L31 and L32 correspond to the respective light-emitting surfaces of the third light-emitting elements S31 and S32. Further, scanning patterns P11 to P15, P31, and P32 illustrated in FIG. 6B are formed when the light source images L11 to L15, L31, and L32 are scanned, and a light distribution pattern PL for low beam is formed as a first light distribution pattern that mainly illuminates a range lower than a horizontal line when respective scanning patterns overlap.

In addition, when the third light-emitting elements S31 and S32 are continuously turned on in the same manner as the first light-emitting elements S11 to S15, as illustrated in FIG. 6B, not only the own vehicle side cutoff line CL1 but also the opposite lane side cutoff line CL2 in the light distribution pattern PL for low beam is formed above the horizontal line. In this case, the glare may be given to the passenger of the opposite vehicle.

Therefore, the control unit 29 controls the turned-on state of the first light source 20 so that the light-on time of the third light-emitting elements S31 and S32 when forming the light distribution pattern PL for low beam becomes shorter than the light-on time of the first light-emitting elements S11 to S15. More specifically, the controller 29 turns on the corresponding elements in the timing in which the light source images L31 and L32 of the third light-emitting elements S31 and S32 pass through a left region of line V-V illustrated in FIG. 6B, and turns off the corresponding elements in the timing passing through the right region of the line V-V. Thus, it becomes possible, for example, to raise only the upper end of the own vehicle side cutoff line CL1. Further, the position (length) of the own vehicle side cutoff line CL1 may be changed by controlling the light-on/light-off of the third light-emitting elements S31 and S32 while scanning the light emitted from the third light-emitting elements S31 and S32.

Figure 7A:
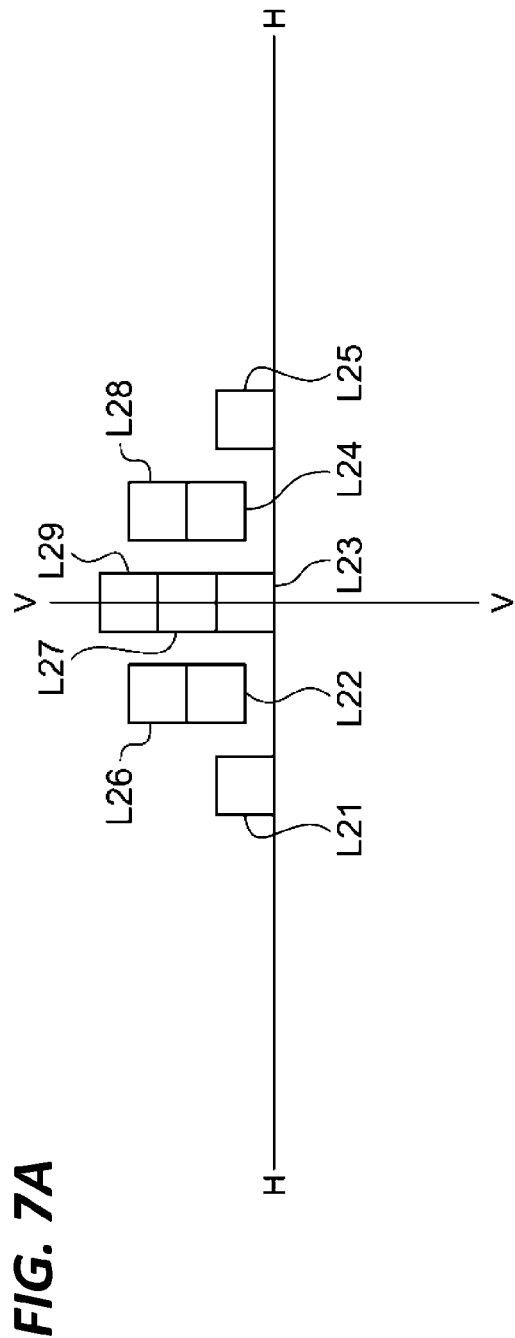
FIG. 7A is a schematic view illustrating a state in which a second light-emitting portion in a turned-on state is reflected by a stationary rotary reflector and projected forward as a light source image.
Figure 7B:
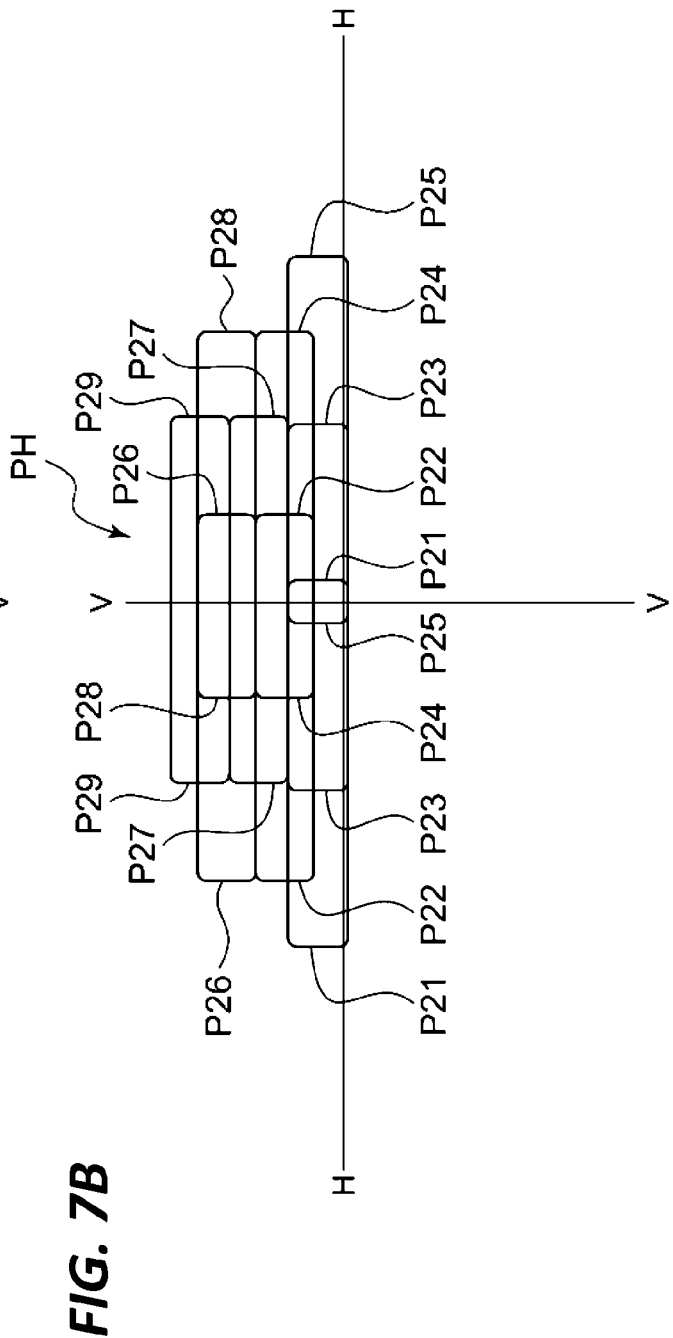
FIG. 7B is a view illustrating a second light distribution pattern formed when the light source image illustrated in FIG. 7A is scanned due to the rotation of the rotary reflector.

FIG. 7A is a schematic view illustrating a state in which a second light-emitting portion in a turned-on state is reflected by a stationary rotary reflector and projected forward as a light source image. FIG. 7B is a view illustrating a second light distribution pattern formed when the light source image illustrated in FIG. 7A is scanned due to the rotation of the rotary reflector.

The light source images L21 to L29 illustrated in FIG. 7A correspond to the respective light-emitting surfaces of the second light-emitting elements S21 to S29. Further, scanning patterns P21 to P29 illustrated in FIG. 7B are formed when the light source images L21 to L29 are scanned, and a light distribution pattern PH for high beam as a second light distribution pattern that illuminates a range at least higher than a horizontal line is formed when respective scanning patterns overlap. Further, the first light-emitting portion 36 may be turned on when forming the light distribution pattern PH for high beam. Thus, it is possible to implement a new light distribution pattern in which the light distribution pattern PL for low beam and the light distribution pattern PH for high beam overlap.

Next, the second light source 26 will also be described. The second light L2 emitted from the second light source 26 is reflected in the blade of the rotary reflector 22 at a position closer to the projection lens 24 than a position where the first light L1 emitted from the first light source 20 is reflected in the blade of the rotary reflector 22. For this reason, the light emitted from the second light source 26 may be widened in order to illuminate a wide range. Thus, the diffusing lens 28 is disposed near the light-emitting surface of the second light source 26. As a result, the light source image may be enlarged by the second light L2 that is reflected in the rotary reflector 22 and passes through the diffusing portion 24b of the projection lens 24. Further, the second light source 26 has a fourth light-emitting portion 42 in which four fourth light-emitting elements S41 to S44 are arranged in a row (see, e.g., FIG. 1).

FIG. 8A is a schematic view illustrating a state in which a fourth light-emitting portion in a turned-on state is reflected by a stationary rotary reflector and projected forward as a light source image. FIG. 8B is a view illustrating a third light distribution pattern formed when the light source image illustrated in FIG. 8A is scanned due to rotation of the rotary reflector.

The light source images L41 to L44 illustrated in FIG. 8A correspond to the respective light-emitting surfaces of the fourth light-emitting elements S41 to S44. Further, scanning patterns P41 to P44 illustrated in FIG. 8B are formed when the light source images L41 to L44 are scanned, and a light distribution pattern PL' for diffusing low beam is formed as a third light distribution pattern that mainly illuminates a range having a lower portion wider than a horizontal line when respective scanning patterns overlap.

Figure 9:
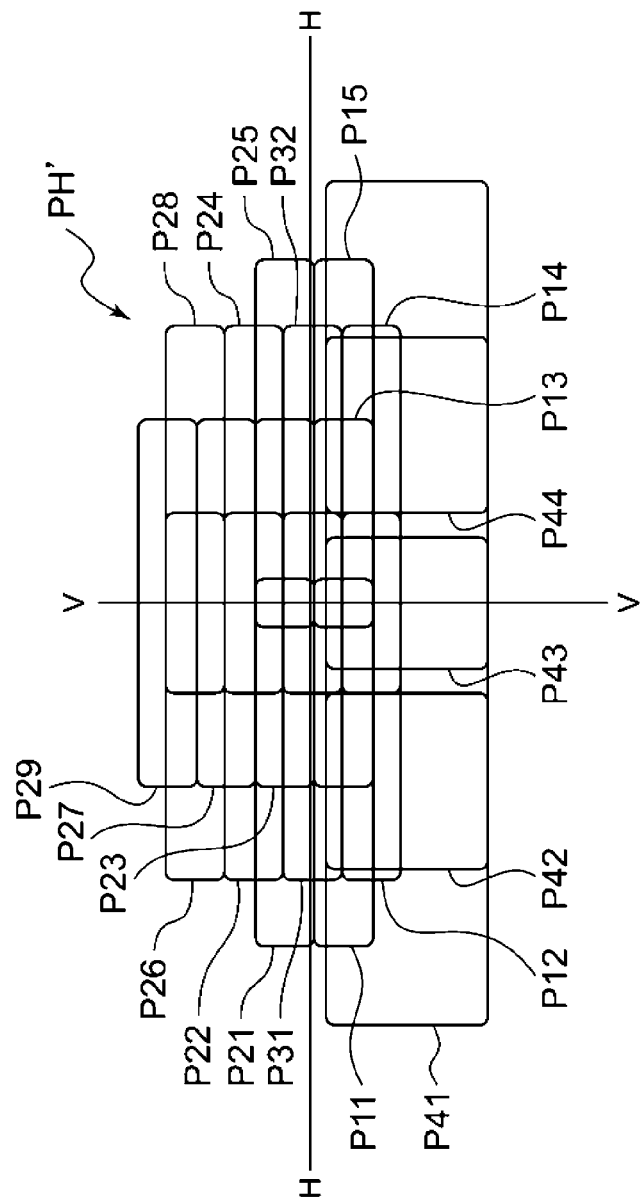
FIG. 9 is a view illustrating a light distribution pattern PH' for high beam formed when all the light-emitting elements of the first light source and a second light source are turned on and scanned.

FIG. 9 is a view illustrating a light distribution pattern PH' for high beam formed when all the light-emitting elements of the first light source and the second light source are turned on and scanned. As illustrated in FIG. 9, it is possible to implement a new light distribution pattern other than the first light distribution pattern and the second light distribution pattern.

As described above, the optical unit 18 according to the present exemplary embodiment may form a plurality of light distribution patterns PL, PL', PH, and PH' having different illumination ranges using the rotary reflector 22 that rotates in one direction around the rotation axis while reflecting the light emitted from the first light source 20 and the second light source 26.

Further, although the first light-emitting portion 36 and the second light-emitting portion 38 may be provided as completely different regions as the first light source 20 of the present exemplary embodiment, some of the light-emitting elements or the light-emitting regions may overlap. That is, there may be a light-emitting element or a light-emitting region used for either the first light distribution pattern or the second light distribution pattern.

Figure 10:
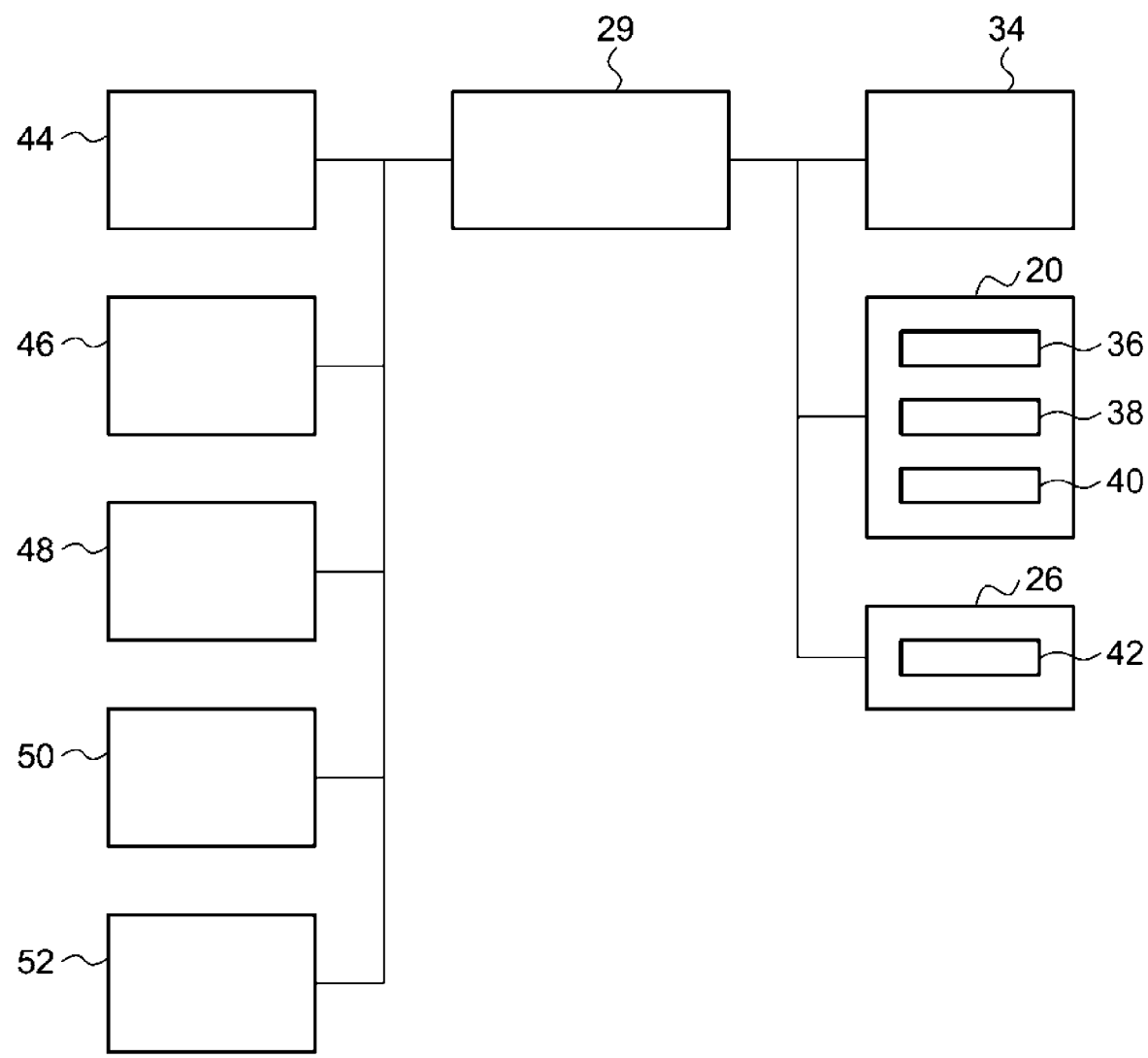
FIG. 10 is a view illustrating a control device of a vehicular headlight according to the present exemplary embodiment.

FIG. 10 is a view illustrating a control device of a vehicular headlight according to the present exemplary embodiment. As illustrated in FIG. 10, the control device 10 of the vehicular headlight 10 according to the present exemplary embodiment includes: a camera 44 configured to photograph the front side of a vehicle and a surrounding thereof; a radar 46 configured to detect the distance and presence of another vehicle or a pedestrian in front of the vehicle; a switch 48 configured to control the light-on state of the vehicular headlight and the illumination mode thereof (selection of a light distribution pattern for high beam and a light distribution pattern for low beam, an automatic control mode, or the like) by a driver; a detection unit 50 configured to detect a steering state; a sensor 52 such as a vehicle speed sensor and an acceleration sensor; a controller 29; a motor 34; a first light source 20; and a second light source 26.

The controller 29 controls the rotation of the motor 34 and the light-on/light-off of each light-emitting element in the first light-emitting portion 36 to the fourth light-emitting portion 42 of the first light source 20 and the second light source 26 based on the information acquired from the camera 44, the radar 46, the switch 48, the detection unit 50, and the sensor 52. Thus, a new optical unit 18 capable of forming a plurality of light distribution patterns with a simple configuration may be implemented.

[Second Exemplary Embodiment]

In the vehicular headlight 10 according to the first exemplary embodiment, the shape of the blade 22a of the rotary reflector 22 is twisted such that an angle formed by the optical axis Ax and the reflective surface changes as the shape of the blade 22a is oriented in the circumferential direction centered on the rotation axis R. In the meantime, in the vehicle headlight 10 according to a third exemplary embodiment, a polygon mirror is used as a rotary reflector, and there is no substantial difference from the first exemplary embodiment. Therefore, in the following explanations, the rotary reflector will be described in detail. The same components as in the first exemplary embodiment will be denoted by the same reference numerals, and a description thereof will be appropriately omitted.

Figure 11:
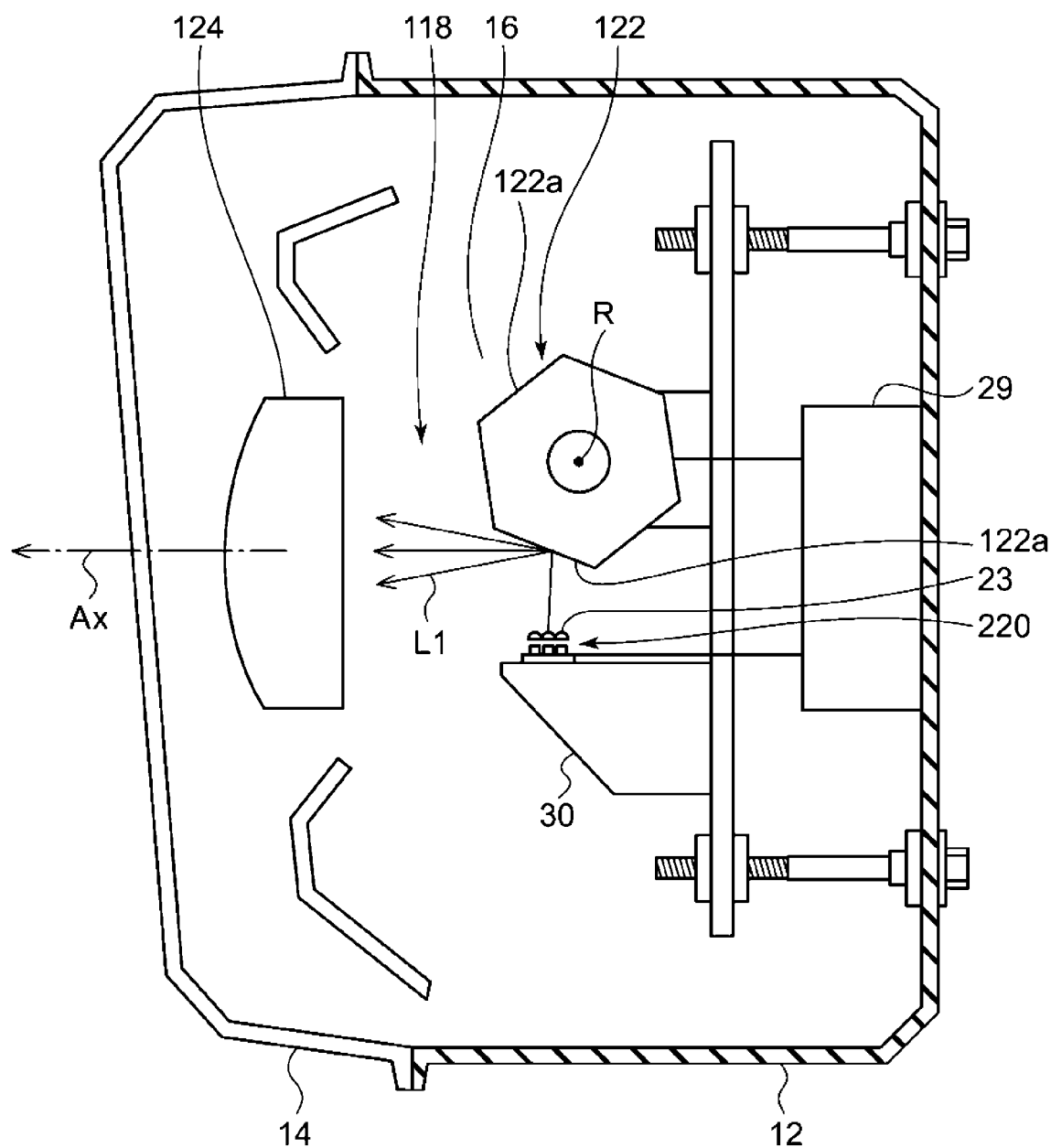
FIG. 11 is a horizontal sectional view of a vehicular headlight according to a second exemplary embodiment.

FIG. 11 is a horizontal sectional view of a vehicular headlight according to the second exemplary embodiment. The vehicular headlight 110 according to the third embodiment has a lamp body 12 having a concave portion opening toward the front. The front opening of the lamp body 12 is covered with a transparent front cover 14 so as to form a lamp chamber 16 in the lamp body. The lamp chamber 16 functions as a space in which one optical unit 118 is accommodated. The optical unit 118 is a lamp unit configured to irradiate both the variable high beam and the low beam.

The optical unit 118 according to the present exemplary embodiment includes: a light source 220; a condensing lens 23 as a primary optical system (optical member) configured to change the optical path of the first light L1 emitted from the light source 220 and direct the first light L1 toward the reflective surface 122a of a polygon mirror 122; the polygon mirror 122 configured to rotate around the rotation axis R while reflecting the first light L1; a projection lens 124; and a controller 29.

In the light source 220, a plurality of elements are arranged in the form of a matrix. The projection lens 124 condenses and projects the first light L1 reflected in the polygon mirror 122 in the light illuminating direction (leftward direction in FIG. 1) of the optical unit. Thus, the light source image may be clearly projected in front of the optical unit 118.

The polygon mirror 122 rotates in one direction around the rotation axis R by a drive source such as a motor. In addition, the polygon mirror 122 is provided with a reflective surface 122a so as to form a desired light distribution pattern by scanning the light of each light source reflected by the polygon mirror while the polygon mirror rotates. That is, the polygon mirror 122 emits visible light from the light-emitting portion as an illuminating beam by its rotation operation, and forms the desired light distribution pattern by scanning the illuminating beam.

The rotation axis R of the polygon mirror 122 is substantially perpendicular to the optical axis Ax and is provided so as to cross a plane including the optical axis Ax and the light source 220. In other words, the rotation axis R is provided so as to be substantially orthogonal to the scanning plane of the light (illuminating beam) of the light source scanned in the lateral direction by the rotation. It is also possible to form the above-described various light distribution patterns in the vehicular headlight 110 using the polygon mirror 122.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An optical unit comprising:
   a light source; and
   a rotary reflector configured to reflect a light emitted from the light source and rotate around a rotation axis in one direction,
   wherein the rotary reflector is provided with a reflective surface such that a desired light distribution pattern is formed by scanning a light of a light source which is reflected by the rotary reflector while the rotary reflector is rotated, and
   the light source includes:
   a first light-emitting portion configured to be turned on when forming a first light distribution pattern that mainly illuminates a range lower than a horizontal line; and
   a second light-emitting portion configured to be turned on when forming a second light distribution pattern that illuminates a range at least higher than the horizontal line,
   wherein the light source further includes a third light-emitting portion configured to emit a light forming an own vehicle side cutoff line near the horizontal line when the first light distribution pattern is formed, and
   the third light-emitting portion is disposed in a region between the first light-emitting portion and the second light-emitting portion.

2. The optical unit of claim 1, wherein the first light-emitting portion has a plurality of first light-emitting elements that are arranged in a zigzag form along a predetermined direction, wherein the first light-emitting elements each have a rectangular light-emitting surface and one side of the rectangular light-emitting surface is arranged along the predetermined direction,
   the second light-emitting portion has a plurality of second light-emitting elements that are arranged in a zigzag form along the predetermined direction, wherein the second light-emitting elements each have a rectangular light-emitting surface and one side of the rectangular light-emitting surface is arranged along the predetermined direction, and
   the third light-emitting portion has a third light-emitting element arranged between the first light-emitting elements and the second light-emitting elements, wherein one side of the rectangular light-emitting surface of the third light-emitting element is arranged along the predetermined direction.

3. The optical unit of claim 1, further comprising:
   a controller configured to control a light-on state of the light source such that a light-on time of the third light-emitting portion when forming the first light distribution pattern becomes smaller than a light-on time of the first light-emitting portion.

4. The optical unit of claim 2, further comprising:
   a controller configured to control a light-on state of the light source such that a light-on time of the third light-emitting portion when forming the first light distribution pattern becomes smaller than a light-on time of the first light-emitting portion.

5. The optical unit of claim 1, wherein the first light-emitting portion is turned on when the second light distribution pattern is formed.

6. The optical unit of claim 2, wherein the first light-emitting portion is turned on when forming the second light distribution pattern.

7. The optical unit of claim 3, wherein the first light-emitting portion is turned on when forming the second light distribution pattern.

8. The optical unit of claim 4, wherein the first light-emitting portion is turned on when forming the second light distribution pattern.

9. The optical unit of claim 1, further comprising:
   a projection lens configured to project a light reflected by the rotary reflector in a light illuminating direction of the optical unit.

10. The optical unit of claim 1, wherein the first, the second, and the third light-emitting portions are located on a same horizontal plane when viewed from a front side of the optical unit.

* * * * *